(12) United States Patent
Davis et al.

(10) Patent No.: US 6,798,991 B1
(45) Date of Patent: Sep. 28, 2004

(54) OPTICAL COMMUNICATION SYSTEMS, OPTICAL COMMUNICATION SYSTEM TERMINAL FACILITIES, OPTICAL COMMUNICATION METHODS, AND METHODS OF COMMUNICATING WITHIN AN OPTICAL NETWORK

(75) Inventors: Gary B. Davis, Rowlett, TX (US); Niall Robinson, Dallas, TX (US); Will Russ, Deerfield Beach, FL (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/430,095

(22) Filed: Oct. 29, 1999

(Under 37 CFR 1.47)

(51) Int. Cl.[7] .......................... H04B 10/08; H04J 14/00
(52) U.S. Cl. .............................. 398/19; 398/46; 398/50
(58) Field of Search ................................ 359/110, 117, 359/128, 139; 398/9, 13, 19, 20, 46, 50, 49, 56, 57, 12

(56) References Cited

U.S. PATENT DOCUMENTS

| | | | |
|---|---|---|---|
| 5,930,017 A | | 7/1999 | Davis et al. ................. 359/128 |
| 6,005,694 A | * | 12/1999 | Liu ............................. 359/110 |
| 6,097,515 A | * | 8/2000 | Pomp et al. ................. 359/117 |
| 6,285,475 B1 | * | 9/2001 | Fee ............................. 359/110 |
| 6,507,421 B1 | * | 1/2003 | Bishop et al. ................ 398/56 |

* cited by examiner

Primary Examiner—Leslie Pascal
Assistant Examiner—Dalzid Singh

(57) ABSTRACT

Optical communication systems, terminal facilities of an optical communication system, optical communication methods, and methods of communicating within an optical network are provided. According to one aspect of the invention, an optical communication system includes: a plurality of optical communication conduits individually configured to communicate data communication signals; an optical switch adapted to optically couple a communication path of an associated data terminal with at least one of the optical communication conduits; and a controller configured to monitor the data communication signals and to control the optical switch responsive to the monitoring of the data communication signals.

35 Claims, 8 Drawing Sheets

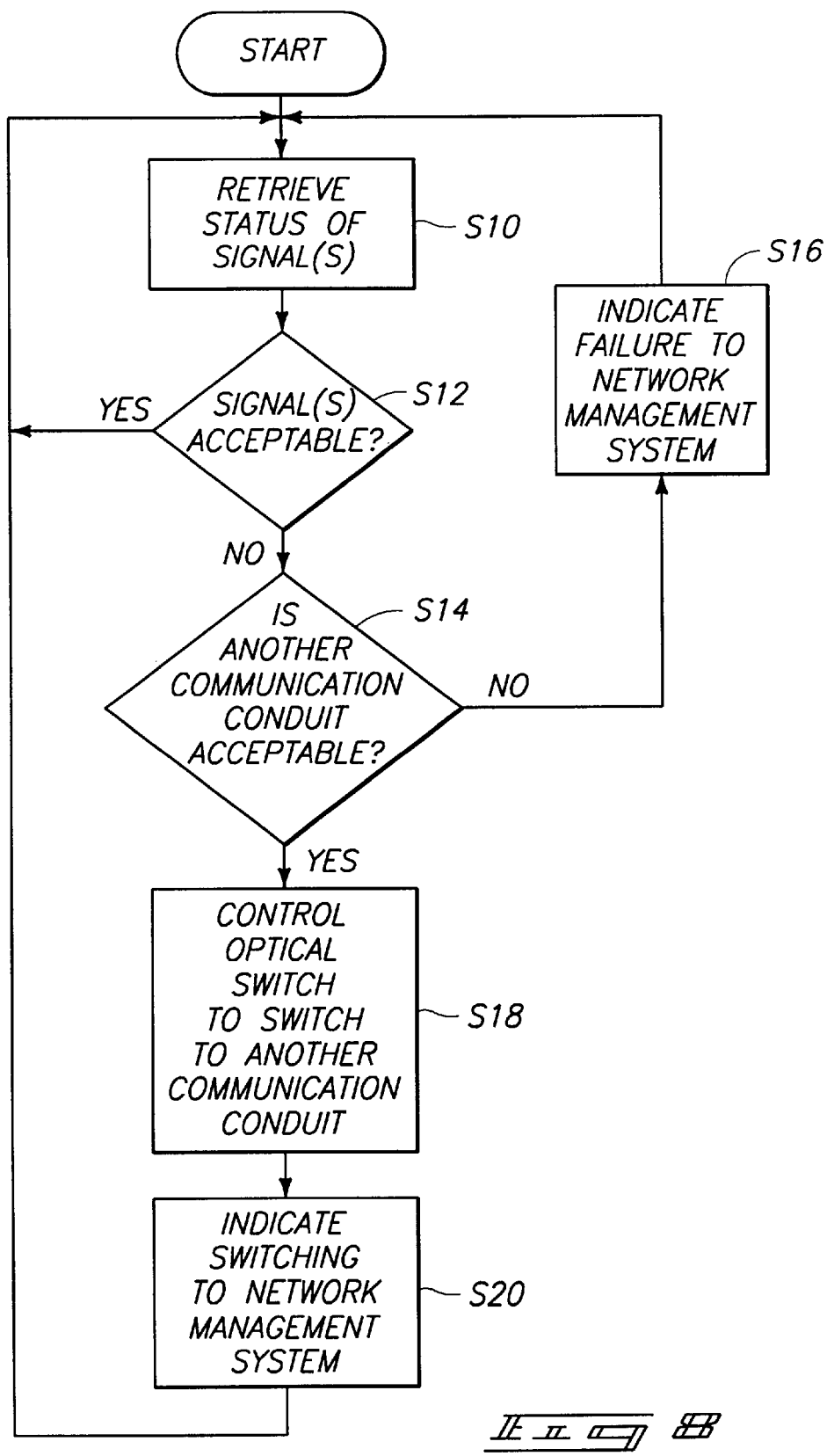

OPTICAL COMMUNICATION SYSTEMS, OPTICAL COMMUNICATION SYSTEM TERMINAL FACILITIES, OPTICAL COMMUNICATION METHODS, AND METHODS OF COMMUNICATING WITHIN AN OPTICAL NETWORK

TECHNICAL FIELD

The present invention relates to optical communication systems, optical communication system terminal facilities, optical communication methods, and methods of communicating within an optical network.

BACKGROUND OF THE INVENTION

Optical or lightwave networks have enjoyed increased popularity in networking applications. Optical network media provides advantageous properties such as extraordinary bandwidth, low loss, low cost, light weight, compactness, strength, flexibility, immunity to interference, security and privacy, and corrosion resistance, for example.

In general, lightwave network architectures include complex combinations of both optical and electronic devices. Lightwave networks are utilized in numerous applications to serve large geographically dispersed users. Numerous factors or considerations are taken into account when designing such optical networks to serve such users. Issues regarding connectivity include providing support for a large number of stations and end systems to support a very large number of concurrent connections including multiple connections per station in one exemplary consideration. Performance issues include high aggregate throughput (on the order of hundreds of terabits per second), high user bit rate (on the order of gigabits per second) and adaptability to changing unbalanced loads.

Structural issues of optical networks include scalability, modularity and survivability. With the ability to provide increased capacity of data communications within modern optical communication systems, more traffic is concentrated upon fewer routes. Such increases the number of customers that can be potentially affected by a failure within a link or span of the network system. Fast and reliable carrier link protection, and node protection and restoration methods are desired to provide rerouting of affected traffic in an accurate and rapid manner. Quick detection, identification and restoration provide robust and reliable networks resulting in increased confidence at the customer level.

Traffic usage will continue to increase as the data capacity of optical or lightwave networks increases. Therefore, there exists a need to provide robust network systems of heightened accuracy and reliability to assure proper communication of the increased amounts of data.

SUMMARY OF THE INVENTION

The present invention provides optical communication systems, optical communication system terminal facilities, optical communication methods, and methods of communicating within an optical network.

According to a first aspect of the invention, an optical communication system comprises: a plurality of optical communication conduits individually configured to communicate data communication signals; an optical switch adapted to optically couple a communication path of an associated data terminal with at least one of the optical communication conduits; and a controller configured to monitor the data communication signals and to control the optical switch responsive to the monitoring of the data communication signals.

A second aspect of the present invention provides an optical communication system terminal facility comprising: circuitry configured to convert data communication signals intermediate an electrical domain and an optical domain; an optical switch adapted to optically couple the circuitry with a plurality of optical communication conduits individually configured to communicate data communication signals provided in the optical domain; and a controller configured to monitor the data communication signals and to control the optical coupling of the optical switch responsive to the monitoring.

Another aspect of the invention provides an optical communication method comprising: converting data communication signals intermediate an electrical domain and an optical domain; providing an optical switch adapted to couple with a plurality of optical communication conduits individually configured to communicate the data communication signals in the optical domain; monitoring the data communication signals; and controlling the optical switch to communicate the data communication signals using one of the optical conduits responsive to the monitoring.

Yet another aspect of the present invention provides a method of communicating within an optical network comprising: providing a plurality of terminal facilities; communicating data communication signals provided within an optical domain intermediate the terminal facilities using one of a plurality of optical communication conduits; monitoring the data communication signals; and switching an optical coupling of at least one of the terminal facilities with the one optical communication conduit to another optical communication conduit responsive to the monitoring.

BRIEF DESCRIPTION OF THE DRAWINGS

FIG. 8 is a flowchart of an exemplary method of controlling restoration switching operations within a terminal facility of the optical communication system.

DETAILED DESCRIPTION OF THE PREFERRED EMBODIMENTS

The protection sought is not to be limited to the disclosed embodiments, which are given by way of example only, but instead is to be limited only by the scope of the appended claims as properly interpreted in accordance with the doctrine of equivalents.

Figure 1:
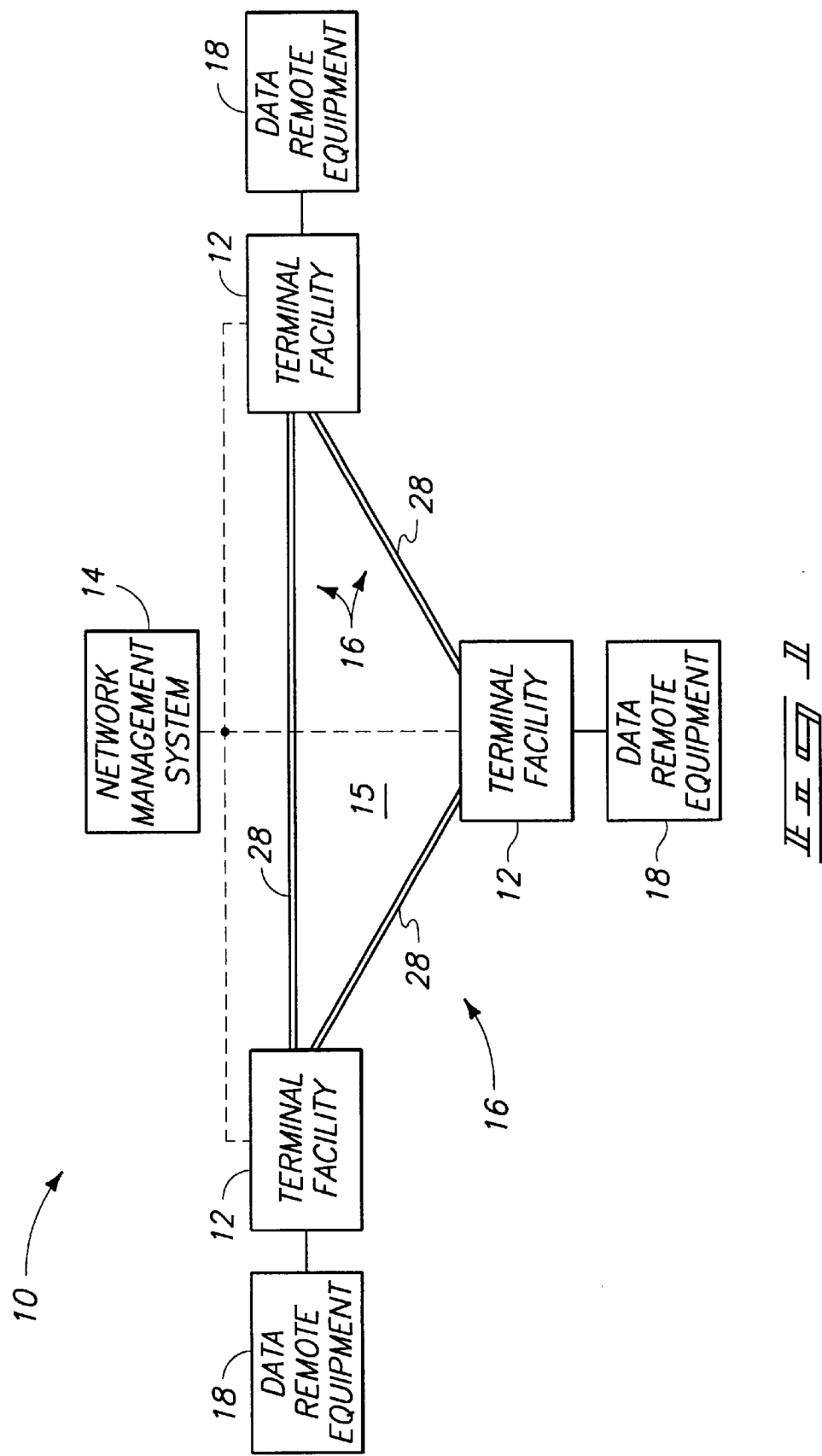
FIG. 1 is a high-level functional block diagram of an exemplary optical communication system.

Referring to FIG. 1, an exemplary embodiment of an optical communication system 10 according to the present invention is illustrated. The depicted optical communication system 10 comprises a plurality of terminal sites or facilities 12, a network management system 14, and an optical network 15 which includes a plurality of network connections 16. Network connections 16 operate to carry information intermediate individual terminal facilities 12.

As shown, data remote equipment devices 18 are coupled to respective terminal facilities 12. Exemplary data remote equipment devices 18 include computers, remote terminals, servers, etc. Individual network connections 16 carry optical data communication signals intermediate terminal facilities 12 thereby effectively interconnecting data remote equipment devices 18. Network connections 16 comprise optical communication conduits 28 such as optical fibers.

Network management system 14 communicates with respective terminal facilities 12. In the described configuration, network management system 14 monitors and manages the flow of data traffic throughout optical network 15 of optical communication system 10.

Figure 2:
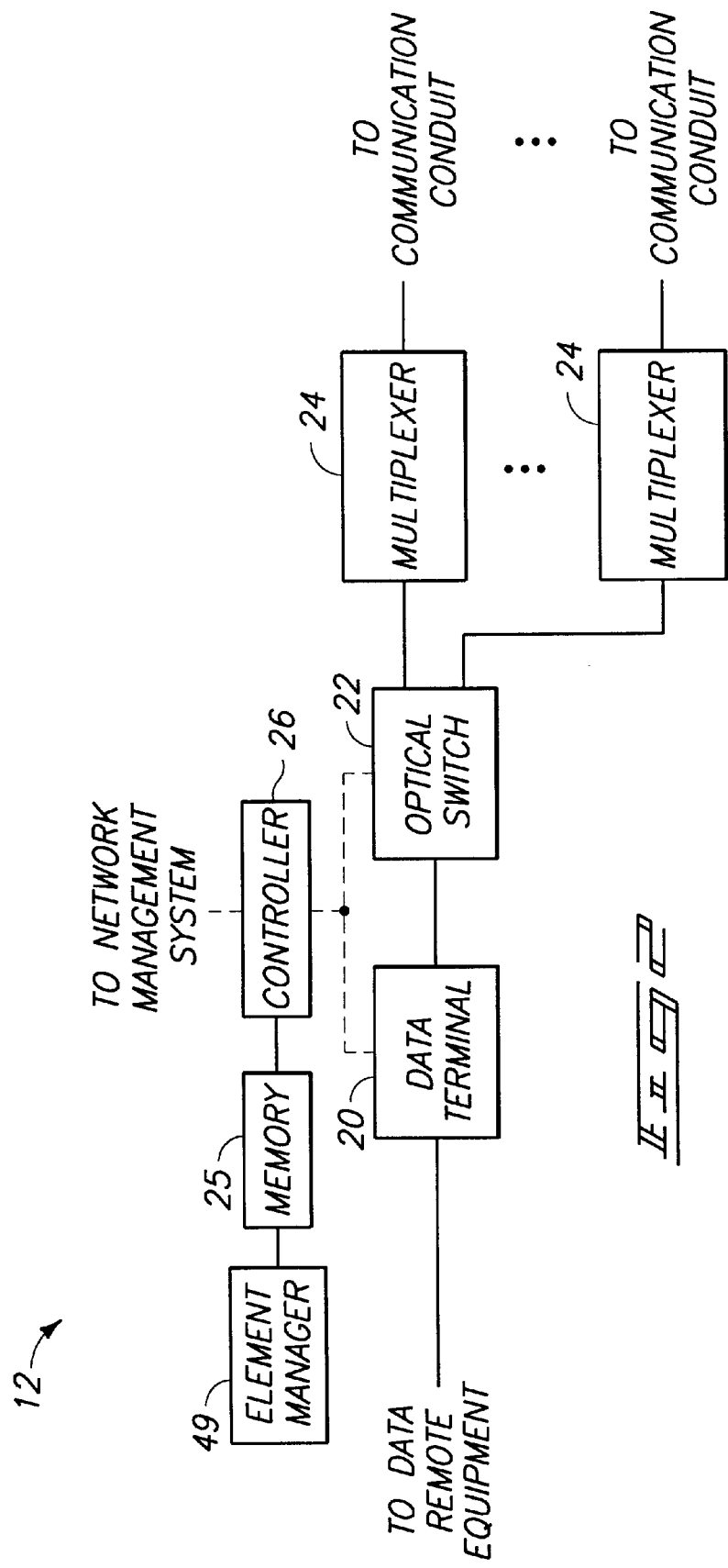
FIG. 2 is a functional block diagram of an exemplary terminal facility of the optical communication system.

Referring to FIG. 2, an exemplary configuration of an individual terminal facility 12 is illustrated. The depicted terminal facility 12 includes a data terminal 20, an optical switch 22, a plurality of multiplexers 24, a memory 25, an optical switch controller 26, and an element manager 49.

Data terminal 20 is configured to generate and process high-speed data communication signals in the described embodiment. Exemplary data terminals 20 include SONET line terminating equipment (LTE), Internet Protocol (IP) routers, Asynchronous Transfer Mode (ATM) switches, etc. In exemplary configurations, data terminal 20 utilizes SONET framing and SONET data rates (OC-48 or OC-192). Other communication protocols are utilized in other configurations.

Although not shown in FIG. 2, data terminal 20 includes one or more communication paths to implement communications as described in detail below. Element manager 49 is provided to enable network personnel to monitor and to control the associated terminal facility 12. Memory 25 comprises read only memory (ROM) and/or random access memory (RAM) configured to store executable instructions and data in exemplary configurations.

Optical switch 22 couples data terminal 20 with multiplexers 24 and the respective optical communication conduits 28. Optical switch 22 comprises an optical cross-connect switch (OCCS) in one configuration. Other configurations of optical switch 22 are provided in other terminal facility arrangements. Optical switch 22 is configured to couple with a plurality of optical communication conduits via multiplexers 24 as described with reference to FIG. 3 below.

An exemplary multiplexer 24 comprises a wavelength-division multiplexing component. Multiplexers 24 are individually configured to couple with an optical communication conduit of optical network 15. Further details of such optical communication conduits are described below. Optical switch 22 is configured to couple such optical communication conduits with communication paths of data terminal 20. Optical switch controller 26 is configured to implement communications with network management system 14. Controller 26 is additionally configured to monitor and control operations of terminal facility 12. More specifically, controller 26 is configured to monitor data communication signals within terminal facility 12, or receive information regarding the quality of communication of such signals within optical network 15, and to control an associated optical switch 22 responsive to such monitoring and/or information of the data communication signals.

Figure 3:
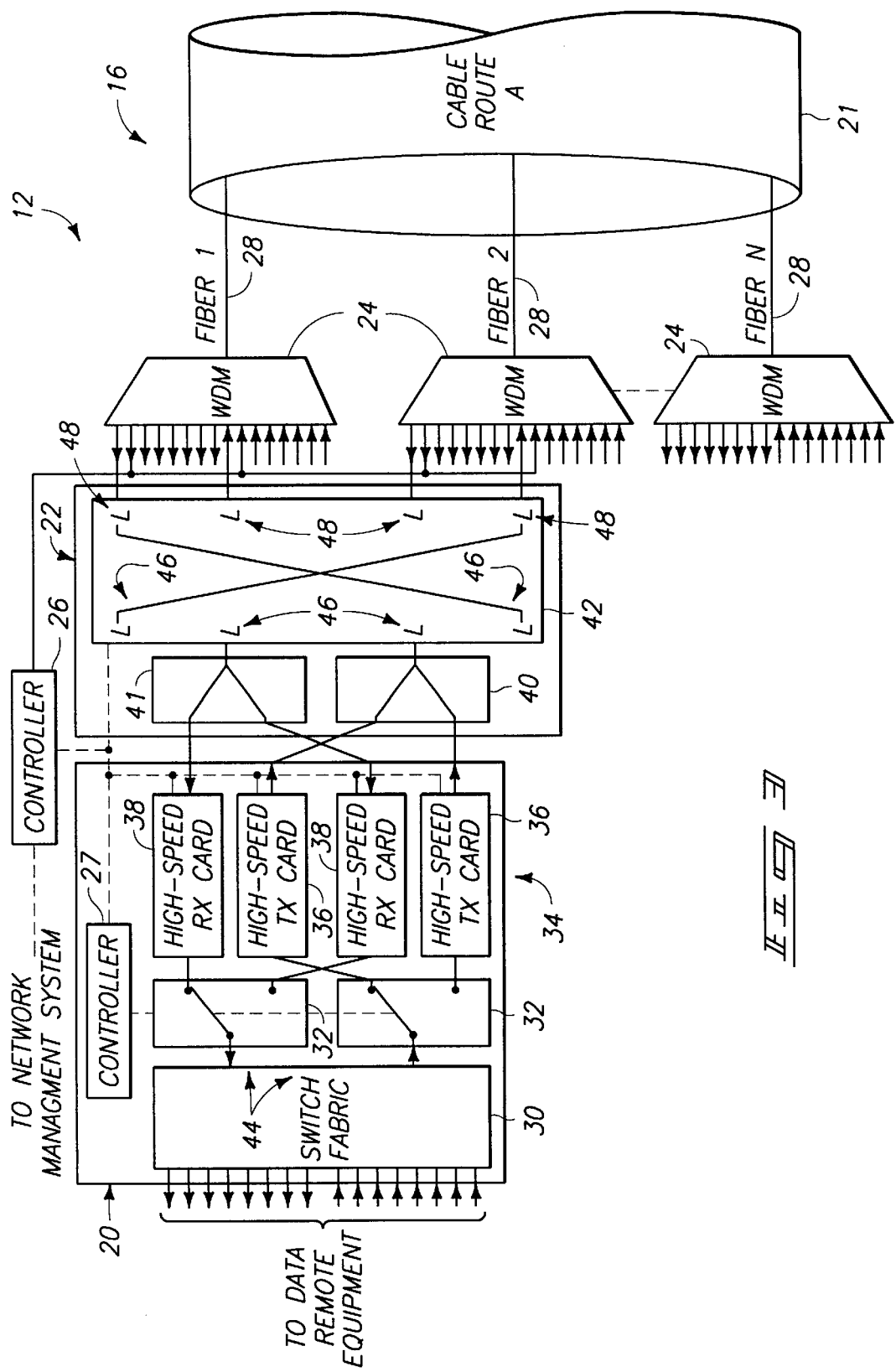
FIG. 3 is a schematic representation of a first exemplary configuration of the terminal facility shown in FIG. 2.

Referring to FIG. 3, an exemplary embodiment of terminal facility 12 and network connection 16 is illustrated. The illustrated configuration of network connection 16 includes a fiber cable 21 comprising a plurality of optical communication conduits 28. Optical communication conduits 28 are individually configured to communicate optical data communication signals. In the described embodiment, optical communication conduits 28 comprise optical fibers of fiber cable 21. Other network connection configurations are provided in other embodiments. For example, optical communication conduits 28 are provided in more than one cable route in another configuration.

The illustrated data terminal 20 includes a data terminal controller 27, switch fabric 30, plural switches 32 and circuitry 34. The depicted arrangement of data terminal 20 includes two transmit/receive pairs within a 1+1 configuration to define plural communication paths 44. Circuitry 34 includes plural high-speed transmit (TX) cards 36 and plural high-speed receive (RX) cards 38 within respective communication paths 44.

Circuitry 34 comprising high-speed TX/RX cards 36, 38 is configured to convert data communication signals intermediate an electrical domain and an optical domain. In an exemplary embodiment, TX cards 36 comprise laser diodes and RX cards 38 comprise photodiodes.

The depicted optical switch 22 includes a combiner 40 and a splitter 41 individually coupled with an optical core matrix switch 42. Combiner 40 is additionally coupled with TX cards 36 while splitter 41 is coupled with RX cards 38. Optical core matrix switch 42 includes plural data terminal ports 46 for coupling with data terminal 20 using combiner 40 and splitter 41. As shown, optical core matrix switch 42 also includes plural network ports 48 for coupling with network connection 16. Optical core matrix switch 42 is configured to selectively optically couple data terminal ports 46 with appropriate network ports 48.

Components 22, 24, 32, 36, 38, 40, 41 of terminal facility 12 provide plural communication paths 44 in the depicted arrangement. Multiplexers 24 operate to couple optical communication conduits 28 with communication paths 44 of terminal facility 12. Communication paths 44 individually comprise full duplex communication paths in the described embodiment.

Typically, only one of communication paths 44 is utilized during normal communication operations. During reception of incoming data communication signals (i.e., signals received within terminal facility 12 from optical network 15), splitter 41 within optical switch 22 operates to split such received signals from optical core matrix switch 42. Such split optical data communication signals are applied to respective RX cards 38 and converted to corresponding electrical data communication signals. Switch 32 operates to couple a desired one of RX cards 38 with switch fabric 30.

Further, for communication of outgoing data communication signals in the described embodiment (i.e., transmit signals applied to optical network 15 from terminal facility 12), one of TX cards 36 is utilized for communications. In particular, switch 32 applies outgoing electrical data communication signals from switch fabric 30 to one of TX cards 36. The appropriate TX card 36 applies optical data communication signals to combiner 40 within optical switch 22. Combiner 40 applies the data communication signals from the appropriate TX card 36 to optical core matrix switch 42.

Components of the plural communication paths 44 are arranged to provide equipment protection within terminal facility 12 in the described embodiment. In particular, switches 32, and circuitry 34 comprising TX cards 36 and RX cards 38, provide equipment protection within data terminal 20 as shown. Combiner 40 and splitter 41 operate to implement equipment protection operations within optical switch 22. The depicted terminal facility 12 is also configured to provide restoration in association with optical network 15. Equipment protection and restoration operations are described in detail below and provide robust and reliable communications within optical communication system 10.

Data terminal controller 27 is operable to implement communications using a desired one of communication paths 44 via control of switches 32. Equipment protection switching occurs to provide communications within terminal facility 12 in the event of component failure. Responsive to the failure of components or degradation of performance within one of communication paths 44, communications are resumed via the other communication path 44 by control of switches 32.

More specifically, pertaining to outgoing data communications, data terminal controller 27 is configured to monitor transmit signals within TX cards 36 to implement equipment protection. During such analysis, controller 27 controls switches 32 to selectively couple both TX cards 36 with switch fabric 30. Controller 27 monitors the quality or status of the signals within TX cards 36 and operates switches 32 to couple the TX card 36 having the higher quality signal with switch fabric 30 for communications. In the described embodiment, controller 27 is configured to monitor internal signal parameters, such as laser bias current, of the signals within TX cards 36. Other signal parameters or qualities are monitored in other embodiments.

Pertaining to incoming data communications, data terminal controller 27 is configured to monitor data signals within one or both of communication paths 44 using respective RX cards 38 in the described configuration. If a data signal received within the RX card 38 being utilized for communications is unacceptable, controller 27 instructs switches 32 to couple the other communication path 44 with network connection 16 to implement equipment protection functionality.

In one exemplary configuration, controller 27 monitors an internal signal parameter, such as laser bias current, of data communication signals within RX cards 38 and controls switches 32 responsive to such monitoring. The depicted arrangement of terminal facility 12 provides fast (e.g., on the order of 1 ms) fault detection information. Optical switch 22 of terminal facility 12 is configured to implement restoration switching in the described configuration. Optical switch controller 26 is configured to coordinate restoration events. Such restoration functionality is described below.

In the described arrangement, working and protect communication conduits 28 of optical network 15 are provided to implement restoration in combination with terminal facilities 12. In the disclosed configuration, fiber 1 is referred to as a working optical communication conduit 28 and fiber 2 is referred to as a protect optical communication conduit 28. The illustrated terminal facility 12 is coupled with working and protect optical communication conduits 28.

As shown, optical switch controller 26 is coupled with high-speed RX cards 38. According to one mode of operation, only one of RX cards 38 is monitored. Alternatively, controller 26 monitors data communication signals within both RX cards 38. Controller 26 is configured in one arrangement to monitor laser-bias current of RX cards 38. Other parameters are monitored in other arrangements.

Accordingly, the occurrence of a fault (e.g., splitting of an optical communication conduit 28) is detected by controller 26 through observation of degradation of the data communication signal received within both RX cards 38. Failure of received signals within both RX cards 38 indicates possible failure of the particular communication conduit 28 being utilized. Responsive to the detection of the fault condition in both RX cards 38, controller 26 operates to control optical core matrix switch 42 to couple communication path 44 of terminal facility 12 with another optical communication conduit 28.

For example, if optical communication conduit 28 comprising working fiber 1 is severed during communications, controller 26 detects the degradation (or absence) of the received data communication signals in both RX cards 38 and controls optical core matrix switch 42 to couple optical communication conduit 28 comprising protect fiber 2 with data terminal 20. Such detection of a failure and switching of the particular optical communication conduit 28 coupled with data terminal 20 implements restoration operations within optical communication system 10.

As shown, optical switch controller 26 is additionally coupled with network connection 16 via one of multiplexers 24. Controller 26 communicates with other associated terminal facilities 12 to instruct such of restoration changes so that the appropriate communication conduit 28 (e.g., protect fiber 2 instead of working fiber 1) at the other end of communications is utilized. Such communications intermediate controllers 26 and terminal facilities 12 are implemented using Transmission Control Protocol/Internet Protocol (TCP/IP) communications in the described embodiment. The associated terminal facilities 12 implement switching operations responsive to a restoration switching event to assure that the appropriate communication conduit 28 is utilized. Terminal facility 12 is configured for either reversion or non-reversion to the original communication conduit 28 (e.g., working fiber 1).

Figure 4:
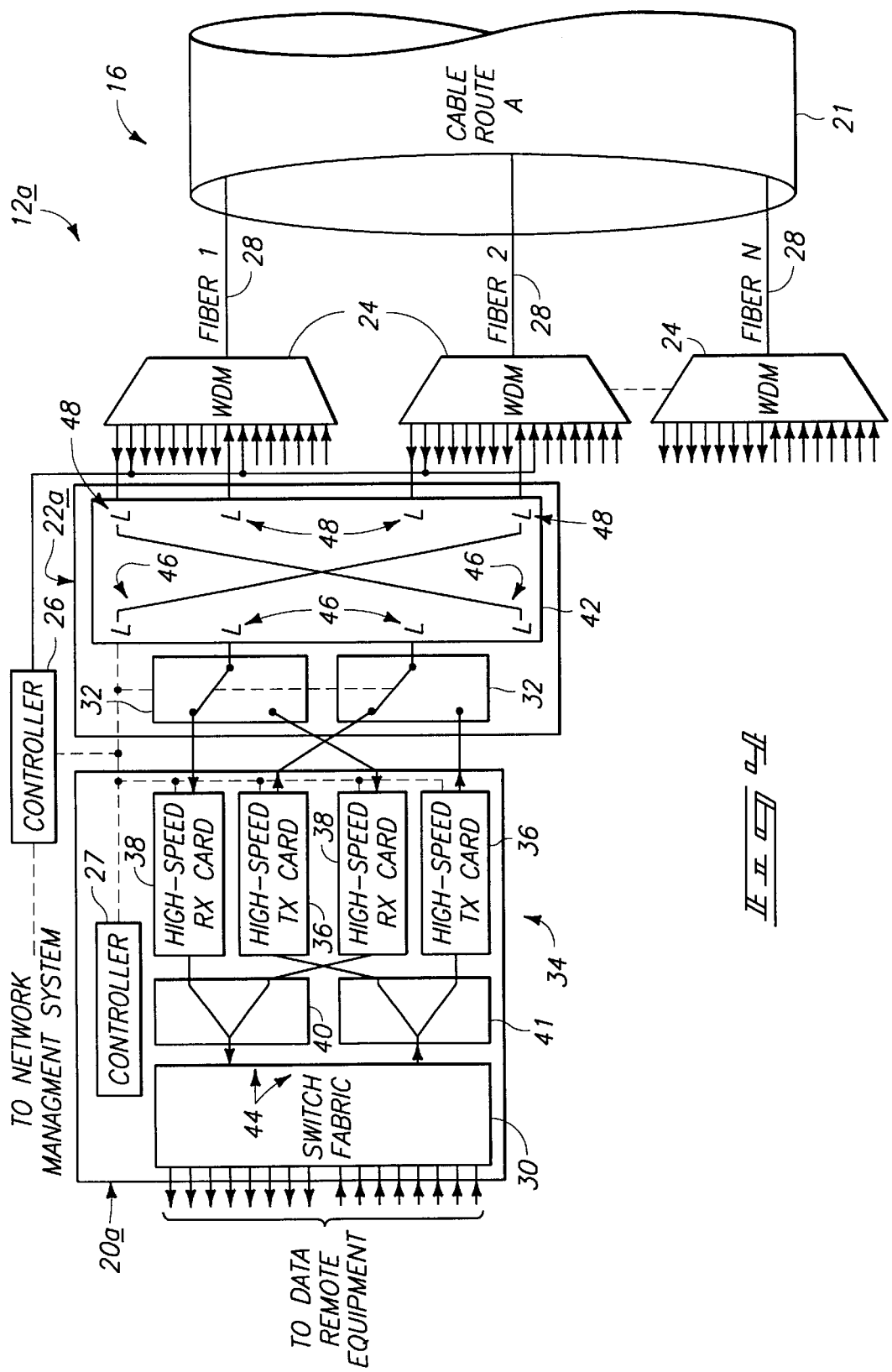
FIG. 4 is a schematic representation of another exemplary configuration of the terminal facility shown in FIG. 2.

Referring to FIG. 4, another exemplary configuration of terminal facility 12a is shown. Like reference numbers represent like components herein with any differences therebetween represented by an alphabetic suffix such as "a".

In the depicted configuration of terminal facility 12a, plural full duplex communication paths 44 are provided within data terminal 20a and optical switch 22a via combiner 40, splitter 41, TX/RX cards 36, 38, and switches 32. As illustrated, equipment protection devices comprising switches 32 are implemented within optical switch 22a. Further, combiner 40 and splitter 41 are implemented within data terminal 20 as shown.

The depicted devices of communication paths 44 provide equipment protection within terminal facility 12a. Switching from one communication path 44 to another is effected using switches 32 responsive to control from optical switch controller 26. Controller 26 is configured to operate switches 32 to couple the desired communication path 44 with the associated communication conduit 28.

During reception of incoming data communication signals, data terminal controller 27a is configured to monitor parameters of the signals within RX cards 38. Data terminal controller 27 monitors the quality of received signals and informs optical switch controller 26 via a defined network management set where to direct the incoming data communication signals. Optical switch controller 26 utilizes switches 32 to implement equipment protection switching and to direct the incoming data communication signals to the appropriate RX card 38 having data communication signals of superior parameters (e.g., laser bias current).

Regarding outgoing communications, splitter 41 is configured to split an outgoing data communication signal and to provide the outgoing split data communication signals to both TX cards 36 simultaneously. Data terminal controller 27 monitors both signals and determines which signal is of better quality responsive to the monitoring. As described previously, data terminal controller 27 is configured to monitor laser bias current within TX cards 36 in one configuration. Other internal parameters are monitored in other configurations.

Data terminal controller 27 advises optical switch controller 26 via a defined network management set where to direct the outgoing signals. Controller 26 thereafter operates to control switches 32 responsive to the monitoring of the data communication signals to provide the signals to the appropriate TX card 36 having the higher quality signals. Such couples the desired communication path 44 with one of communication conduits 28.

Restoration functionality is implemented utilizing optical switch 22a in combination with optical network 15 in the depicted configuration. A fault or failure is detected by data terminal controller 27 responsive to monitoring of RX cards 38. Controller 27 instructs controller 26 to control switches 32 to connect optical switch 22a with the other RX card 38 responsive to the detection of a loss of signal within the RX card 38 being utilized for receive communications. Thereafter, controller 27 monitors signals within the other RX card 38. Loss of signal or the presence of unacceptable signals in both RX cards 38 indicates probable failure of communication conduit 28 (e.g., working fiber 1). Accordingly, controller 27 indicates to optical switch controller 26 the presence of the unacceptable signals. Thereafter, controller 26 controls optical core matrix switch 42 to couple switches 32 with another communication conduit 28 (e.g., protect fiber).

Figure 5:
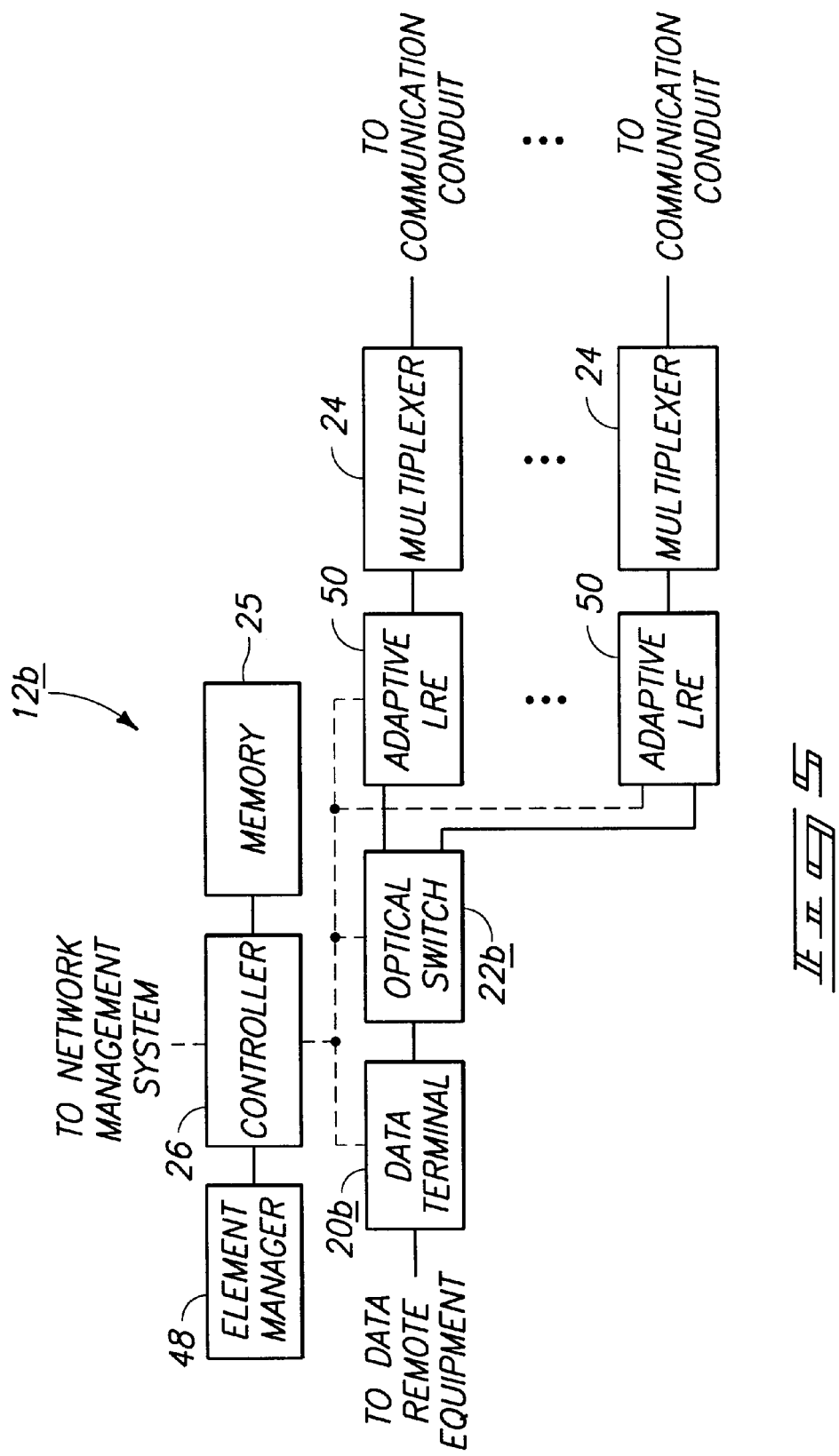
FIG. 5 is a functional block diagram of yet another exemplary terminal facility configuration of the optical communication system.

Referring to FIG. 5, another configuration of terminal facility 12b is illustrated. The depicted configuration of terminal facility 12b includes data terminal 20b, optical switch 22b, multiplexers 24, memory 25, controller 26, element manager 49, and a plurality of adaptive light regenerating equipment (LRE) devices 50. As illustrated, data terminal 20b is operable to couple with data remote equipment and multiplexers 24 are configured to couple with respective communication conduits. Controller 26 is coupled with data terminal 20b, optical switch 22b, memory 25, element manager 49, adaptive LRE devices 50, and the network management system.

Figure 6:
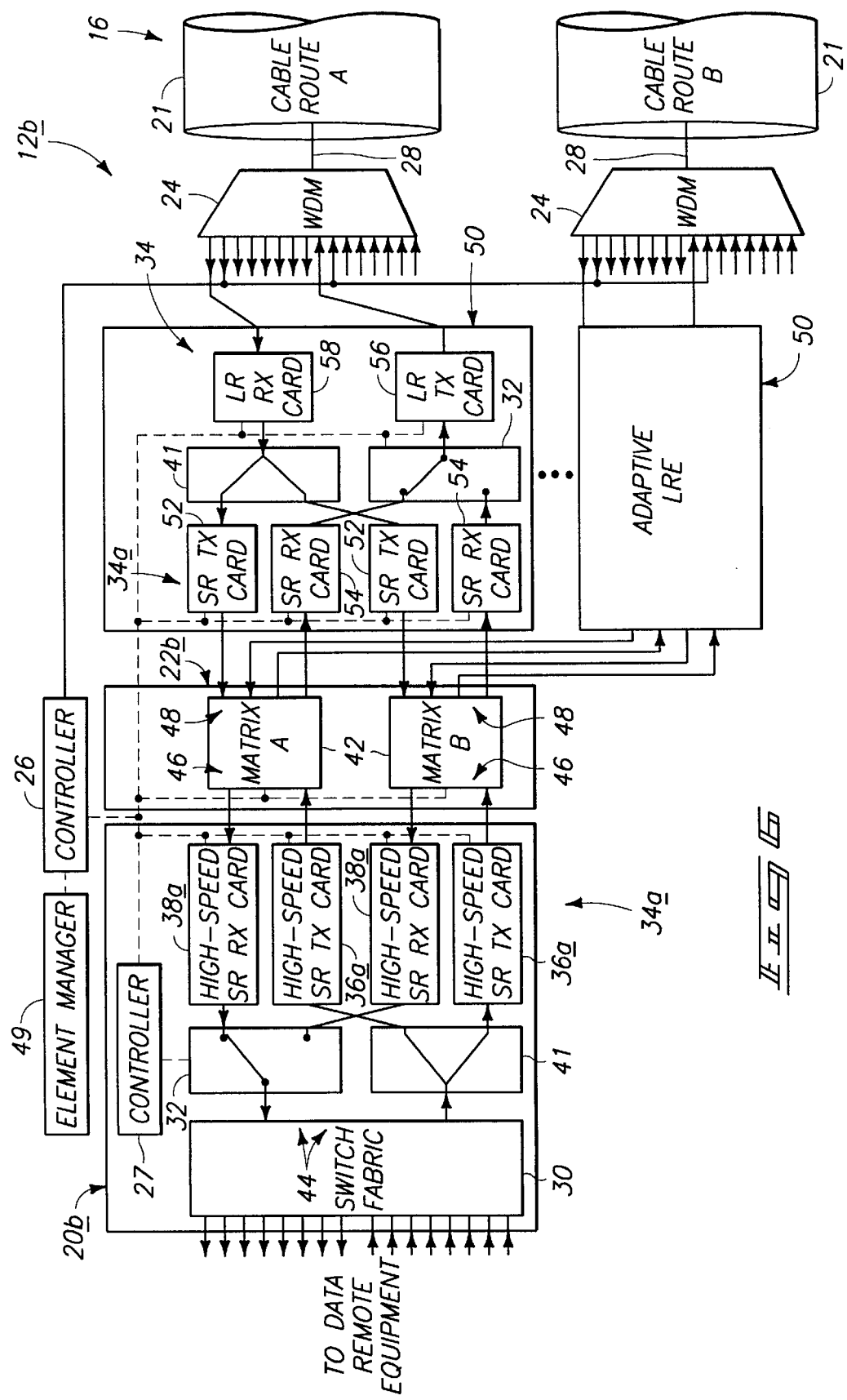
FIG. 6 is a schematic representation of an exemplary configuration of the terminal facility shown in FIG. 5.

Referring to FIG. 6, details of an exemplary terminal facility 12b are described. Terminal facility 12b is arranged in an optical-electrical-optical (OEO) configuration. The depicted configuration of terminal facility 12b is operable to provide equipment protection from data terminal 20b to adaptive LRE devices 50 using redundant optical core matrix switches 42 (illustrated as matrices A, B in FIG. 6). The depicted configuration enables the use of one transmit/receive pair of long-reach communication cards 56, 58 within individual adaptive LRE devices 50. Restoration functionality is implemented utilizing optical switch 22b, adaptive LRE devices 50, multiplexers 24 and plural optical communication conduits 28.

Adaptive LRE devices 50 provide a 1+1 interface with optical switch 22 and a 1+0 interface to the line or optical network side. Such provides equipment protection on the data terminal side while providing one channel (1+0) on the line side.

Data terminal 20b includes a staggered configuration of switch 32 and splitter 41 as shown. More specifically, adaptive LRE devices 50 individually include an inversely staggered configuration of splitter 41 and switch 32 within respective communication paths 44 as illustrated. Further, high-speed TX cards 36a and high-speed RX cards 38a individually comprise short-reach circuitry 34a in the described embodiment. TX, RX cards 36a, 38a communicate with optical core matrix switches 42.

Individual adaptive LRE devices 50 include corresponding short-reach TX and RX cards 52, 54 to communicate with optical core matrix switches 42. Individual adaptive LRE devices 50 additionally include long-reach TX and RX cards 56, 58. Individual communication paths 44 are defined by switches 32, TX, RX cards 36a, 38a, optical core matrix switches 42, TX, RX cards 52, 54, splitters 41, and TX, RX cards 56, 58. Adaptivity of adaptive LRE devices 50 is implemented with respective RX cards 52, 58 of the individual devices. For example, such RX cards 52,58 are configured to adapt to data communication signals having different bit rates, etc., in the described embodiment.

Data communication signals to the left of high-speed cards 36a, 38b are provided within the electrical domain while signals intermediate data terminal 20b and adaptive LRE device 50 and within optical switch 22b are provided within the optical domain. Within individual adaptive LRE devices 50, signals intermediate shortreach TX, RX cards 52, 54 and long-reach TX, RX cards 56, 58 are provided within the electrical domain while signals to the right of long-reach TX, RX cards 56, 58 are provided within the optical domain for communication within network connection 16. The depicted cards 36a, 38a, 52, 54, 56, 58 individually comprise circuitry 34a configured to convert signals intermediate the electrical domain and optical domain. Circuitry 34a is coupled with data terminal ports 46 and network ports 48 in the depicted configuration.

The illustrated terminal facility 12b provides equipment protection and restoration functionality. Referring to equipment protection operations for reception of incoming data communication signals, data terminal controller 27 is configured to monitor a parameter, such as laser bias current, of incoming data communication signals within RX cards 38a. Controller 27 is configured to operate switch 32 within data terminal 20b to couple the appropriate RX card 38a having the signals with superior quality to switch fabric 30 to implement equipment protection operations.

Referring to equipment protection operations for communication of outgoing data communication signals, data terminal controller 27 monitors data communication signals within TX cards 36a and determines which card contains signals of superior quality. As described previously, data terminal controller 27 is configured to monitor laser bias current within TX cards 36a in one configuration. Other internal parameters are monitored in other configurations.

Data terminal controller 27 advises controller 26 via a defined network management set where to direct the signals. Controller 26 thereafter operates to control switch 32 within adaptive LRE device 50 responsive to the monitoring of the data communication signals to provide signals from communication path 44 having higher quality signals to TX card 56. Such couples the desired communication path 44 with one of communication conduits 28 and implements equipment protection functionality. Alternatively, controller 26 monitors signals within RX cards 54 directly and controls switch 32 within adaptive LRE device 50 to couple the RX card 54 having the higher quality signal with TX card 56. In other arrangements, adaptive LRE device 50 includes an internal controller (not shown) to implement monitoring and control functions. In the described configuration, switching operations of optical core matrix switches 42 are synchronized providing equipment protection within terminal facility 12*b*.

The depicted terminal facility 12*b* is also configured for restoration operations in combination with optical network 15. Controller 26 is configured to monitor the condition of received signals from communication conduit 28 within long-reach RX card 58 of an active adaptive LRE device 50. Via such monitoring, optical switch controller 26 implements and coordinates restoration events.

For example, controller 26 operates to couple an appropriate communication path 44 of data terminal 20*b* with a functioning adaptive LRE device 50 utilizing optical switch 22*b*. Controller 26 controls optical core matrix switches 42 to couple data terminal 20*b* with an appropriate adaptive LRE device 50. As illustrated, adaptive LRE devices 50 are individually coupled with plural optical core matrix switches 42 and respective optical communication conduits 28.

In the described embodiment, controller 26 monitors the quality of signals received with RX card 58. Accordingly, controller 26 detects the presence of unacceptable signals with RX card 58. Controller 26 thereafter operates optical switch 22*b* to couple data terminal 20*b* with another adaptive LRE device 50 to implement restoration responsive to the detection of unacceptable signals.

For example, communication conduit 28 of cable route A comprises a working conduit. Controller 26 detects failure of the working conduit via monitoring of signals within RX card 58. Responsive to the detection of such a failure, controller 26 instructs optical switch 22*b* to couple data terminal 20*b* with another communication conduit 28 (e.g., protect communication conduit 28 of cable route B). Such provides restoration functionality.

Additional adaptive LRE devices 50 are provided in typical arrangements although only two such devices are shown in FIG. 6. Controller 26 operates to coordinate restoration events while optical switch 22*b* implements such restoration switching.

Figure 7:
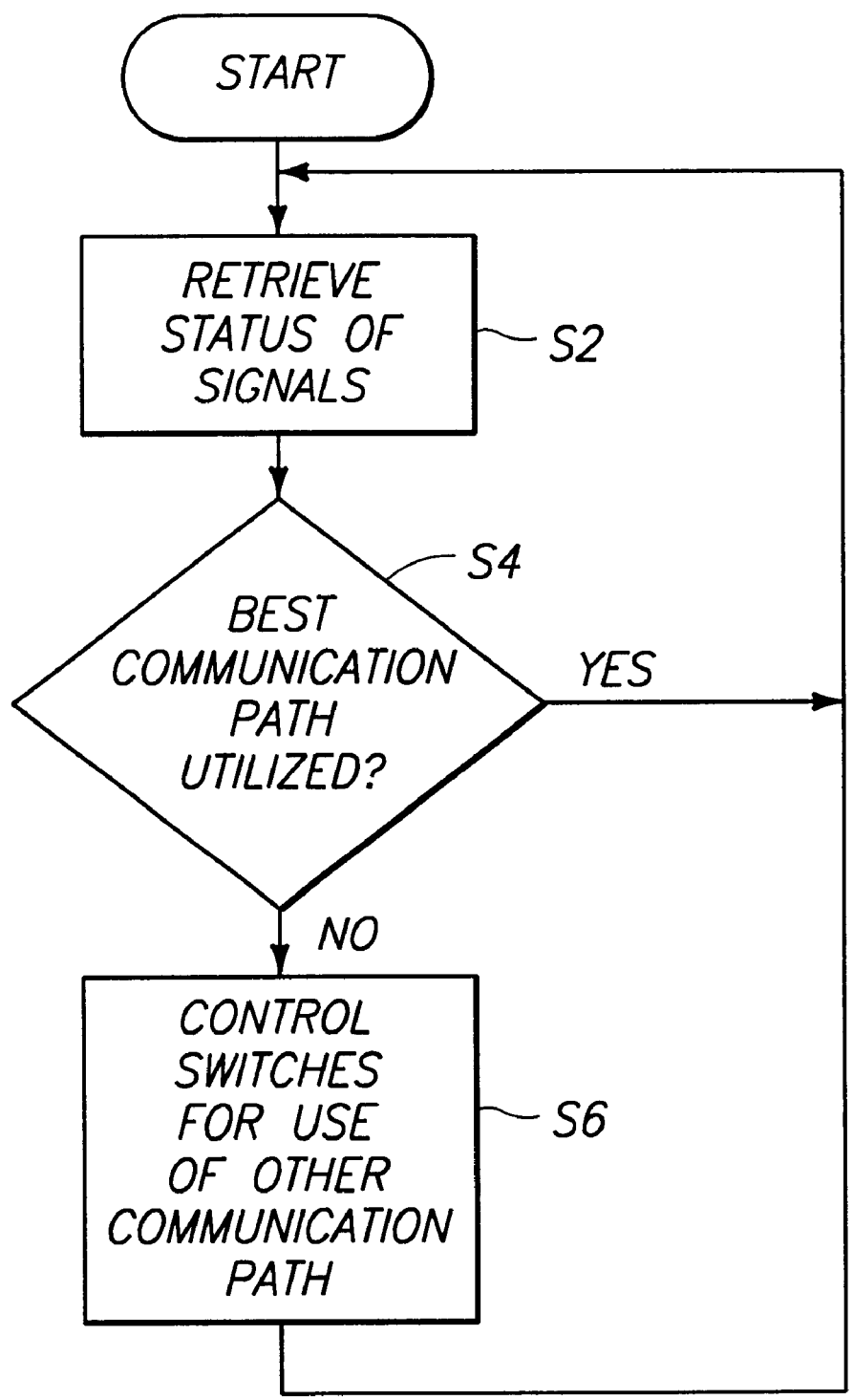
FIG. 7 is a flow chart of an exemplary method of controlling equipment protection switching operations within a terminal facility of the optical communication system.

Referring to FIG. 7, an exemplary control method for implementing equipment protection within terminal facilities 12, 12*a*, 12*b* is described. The depicted control method is triggered responsive to timed operations, control from element manager 49, prompt control from network management system 14, or other conditions. The method is described with reference to execution by data terminal controller 27. The described method is executed by one or more of the controllers disclosed herein in other embodiments. In the described configuration, such controllers individually comprise processing circuitry configured to execute stored instructions or software code to implement the depicted methodology. Such executable instructions or code are stored within memory 25 in one configuration. Alternatively, internal memory (not shown) of data terminals 20, 20*a*, 20*b* stores the executable instructions.

Initially, controller 27 proceeds to step S2 to retrieve the status of data communication signals within communication paths 44. For example, referring to the configurations shown in FIG. 3 and FIG. 4, controller 27 retrieves the status of the signals from appropriate ones of TX, RX cards 36, 38. Such status can correspond to laser bias current within the associated TX, RX cards 36, 38 as described above. For the configuration shown in FIG. 6, controller 27 accesses the status of signals from appropriate ones of TX, RX cards 36*a*, 38*a* and TX, RX cards 52, 54.

Thereafter, controller 27 proceeds to step S4 to determine whether the communication path 44 being utilized contains data communication signals of the highest quality.

Responsive to the condition of step S4 being satisfied, controller 27 returns to step S2 to continue to monitor the status of additional data communication signals.

Alternatively, if the condition of step S4 is not satisfied, controller 27 proceeds to step S6 to control switches 32 for use of the other communication path 44 for the embodiment of terminal facility 12 shown in FIG. 3. For the embodiment of terminal facility 12*a* disclosed in FIG. 4, controller 27 instructs controller 26 to control switches 32 within optical switch 22*a* for use of the other communication path 44. For the embodiment of terminal facility 12*b* disclosed in FIG. 6, controller 27 controls switch 32 located within data terminal 20*b* and switch 32 located within adaptive LRE device 50 for use of the other communication path 44.

Thereafter, controller 27 returns to step S2 to continue to monitor the status of additional data communication signals being communicated.

Referring to FIG. 8, an exemplary control method for implementing restoration operations within terminal facilities 12, 12*a*, 12*b* is described. The depicted control method is triggered responsive to timed operations, control from element manager 49, prompt control from network management system 14, or other conditions. The method is described with reference to optical switch controller 26. The described method is executed by one or more of the controllers disclosed herein in other configurations. Such controllers individually comprise processing circuitry in one embodiment configured to execute stored instructions or software code to implement the depicted methodology. Such executable instructions or code are stored within memory 25 in one configuration.

Initially, controller 26 proceeds to step S10 to retrieve the status of received signal(s) within the data terminal 20. Such status is retrieved from RX cards 38 within data terminals 20, 20*a* for respective terminal facilities 12, 12*a*. Data communication signal status is received from RX cards 58 within adaptive LRE devices 50 for the configuration of terminal facility 12*b* shown in FIG. 6. In the described methodology, controller 26 monitors the condition of data communication signals received from plural communication conduits 28 (e.g., working and protect communication conduits). Alternatively, controller 26 monitors the condition of data communication signals within one communication conduit 28 (e.g., working communication conduit).

Thereafter, controller 26 proceeds to step S12 to determine whether the status of the data communication signal(s) is acceptable. For example, controller 26 is configured in one aspect to monitor laser bias current within the appropriate associated RX cards 38, 58 depending upon the configuration of the terminal facility. Other parameters are monitored to assess the quality of received data communication signals in other configurations.

If the data communication signal(s) are deemed acceptable by controller 26, the depicted method of monitoring the data communication signals ends until another triggering event.

Alternatively, controller 26 proceeds to step S14 if the condition of the data communication signals is not deemed acceptable at step S12. At step S14, controller 26 determines whether data communication signals received via another communication conduit 28 (e.g., protect communication conduit) are acceptable.

If the data communication signals received from the other communication conduit 28 are not acceptable, controller 26 thereafter proceeds to step S16 to output a signal to network management system 14 indicating the failure of communications within both communication conduits 28.

Alternatively, if the data communication signals received from the other communication conduit 28 are acceptable, controller 26 proceeds to step S18. At step S18, controller 26 controls appropriate optical switch 22, 22a, 22b to couple a respective one of data terminals 20, 20a, 20b with the other communication conduit 28 (e.g., a protect communication conduit) to route future data communication signals.

From step S18, controller 26 proceeds to step S20. At step S20, controller 26 indicates the restoration function of switching from the first communication conduit 28 (e.g., a working communication conduit) to the second communication conduit 28 (e.g., a protect communication conduit) to network management system 14.

The above-described methodology is exemplary. In alternative methodologies, controller 26 proceeds directly to step S18 from step S12 (responsive to the condition of step S12 not being satisfied) without first monitoring the status of the other communication conduit 28 before switching optical switch 22.

What is claimed is:

1. An optical communication system comprising:
   a plurality of optical communication conduits individually configured to communicate data signals;
   an optical switch adapted to optically couple a communication path of an associated data terminal with one of the plurality of optical communication conduits;
   a first controller coupled to the optical switch for controlling the optical switch; and
   a second controller configured to monitor communication of the data signals, to select one of the plurality of the optical communication conduits based on the monitoring, and to instruct the first controller to control the optical switch to couple to the selected optical communication conduit.

2. The system according to claim 1 further comprising circuitry configured to convert the data signals intermediate an electrical domain and an optical domain.

3. The system according to claim 2 wherein the circuitry comprises a plurality of equipment protection devices.

4. The system according to claim 3 wherein at least one of the equipment protection devices is provided within the optical switch.

5. The system according to claim 2 wherein the optical switch includes a plurality of data terminal ports and a plurality of network ports, and the circuitry is coupled with the data terminal ports and the network ports.

6. The system according to claim 1 further comprising an adaptive light regenerating equipment LRE device coupled with the optical switch and at least one of the optical communication conduits.

7. The system according to claim 1 wherein the optical switch comprises a plurality of synchronized optical core matrix switches.

8. The system according to claim 1 wherein the optical communication conduits comprise a working conduit and a protect conduit.

9. The system according to claim 1 wherein the optical switch comprises an optical cross-connect switch.

10. An optical communication system terminal facility comprising:
    circuitry configured to convert data signals intermediate an electrical domain and an optical domain, the circuitry optically coupling to an optical switch interfacing with a plurality of optical communication conduits individually configured to communicate data signals provided in the optical domain; and
    a controller configured to monitor communication of the data signals, to select one of the plurality of the optical communication conduits based on the monitoring, and to instruct an optical switch controller to control the optical switch to couple to the selected optical communication conduit.

11. The terminal facility according to claim 10 further comprising a data terminal and the circuitry is provided within the data terminal.

12. The terminal facility according to claim 10 wherein the circuitry comprises a plurality of equipment protection devices.

13. The terminal facility according to claim 10 further comprising an equipment protection device within the optical switch.

14. The terminal facility according to claim 10 wherein the optical switch includes a plurality of data terminal ports and a plurality of network ports, and the circuitry is coupled with the data terminal ports and the network ports.

15. The terminal facility according to claim 10 further comprising an adaptive light regenerating equipment LRE device coupled with the optical switch and at least one of the optical communication conduits.

16. The terminal facility according to claim 10 wherein the optical switch comprises an optical cross-connect switch.

17. An optical communication method comprising:
    converting data signals from an optical switch intermediate an electrical domain and an optical domain, wherein the optical switch is coupled to a plurality of optical communication conduits individually configured to communicate data signals provided in the optical domain;
    monitoring communication of the data signals;
    selecting, by a first controller, one of the plurality of the optical communication conduits based on the monitoring; and
    instructing by the first controller to a second controller for controlling the optical switch to couple to the selected optical communication conduit.

18. The method according to claim 17 further comprising communicating the data signals using one of the optical conduits.

19. The method according to claim 18 wherein the monitoring comprises monitoring after the communicating.

20. The method according to claim 17 wherein the providing comprises providing an optical switch comprising at least one equipment protection device.

21. The method according to claim 17 wherein the providing comprises providing an optical cross-connect switch.

22. The method according to claim 17 further providing equipment protection during the converting.

23. The method according to claim 17 wherein the controlling comprises controlling to implement restoration within the optical communication conduits.

24. A data terminal for supporting monitoring of an optical network, the terminal comprising:
    a plurality of transmission interfaces coupled to an optical switch and configured to convert between an optical domain to an electrical domain, wherein the optical switch supports transmission of signals from a plurality of communication paths within the optical network; and a controller coupled to the transmission interfaces and configured to monitor signal quality of the signals within the transmission interfaces to determine whether the signal quality satisfies a predetermined transmission criterion, wherein the controller communicates with an optical switch controller coupled to the optical switch to switch from one of the communication paths to another one of the communication paths based on whether the predetermined transmission criterion is satisfied.

25. A terminal according to claim 24, wherein the communication paths include designated working conduits and designated protect conduits, the one communication path being one of the working conduits and the other communication path being one of the protect conduits.

26. A terminal according to claim 24, wherein the transmission interfaces include a receive card and a transmit card, the terminal further comprising:

a switch coupled to the transmission interfaces and configured to switch one of the signals received on the receive card to the transmit card based on the monitoring by the controller.

27. A terminal according to claim 24, wherein the transmission interfaces include a receive card and a plurality of transmit cards, the terminal further comprising:

a port configured to receive an incoming signal from a data equipment;

a switch fabric configured to process the incoming signal from the port; and a splitter coupled switch fabric and configured to split the incoming signal over the transmit cards for simultaneous transmission to the optical switch.

28. A terminal according to claim 24, wherein the transmission interfaces include a plurality of receive cards and a plurality of transmit cards, each of the cards being configured to generate status information on the signals processed by the cards to the controller.

29. A terminal according to claim 28, wherein the controller determines whether the predetermined transmission criterion is satisfied based on status information concurrently received from multiple ones of the cards.

30. A method for supporting monitoring of an optical network, the method comprising:

converting signals received from an optical switch between an optical domain to an electrical domain, wherein the optical switch supports transmission of signals from a plurality of communication paths within the optical network;

monitoring signal quality of the signals within a plurality of transmission interfaces;

determining whether the signal quality satisfies a predetermined transmission criterion; and communicating with an optical switch controller coupled to the optical switch to switch from one of the communication paths to another one of the communication paths based on whether the predetermined transmission criterion is satisfied.

31. A method according to claim 30, wherein the communication paths include designated working conduits and designated protect conduits, the one communication path being one of the working conduits and the other communication path being one of the protect conduits.

32. A method according to claim 30, wherein the transmission interfaces include a receive card and a transmit card, the method further comprising:

switching one of the signals received on the receive card to the transmit card based on the determining step.

33. A method according to claim 30, wherein the transmission interfaces include a receive card and a plurality of transmit cards, the method further comprising:

receiving an incoming signal from a data equipment over a port coupled to a switch fabric; and splitting the incoming signal processed by the switch fabric over the transmit cards for simultaneous transmission to the optical switch.

34. A terminal according to claim 30, wherein the transmission interfaces include a plurality of receive cards and a plurality of transmit cards, each of the cards being configured to generate status information on the signals.

35. A terminal according to claim 30, further comprising:

concurrently receiving status information from multiple ones of the cards, wherein the determining step is performed based on the received status information.

* * * * *